(12) United States Patent
Nijkamp et al.

(10) Patent No.: US 10,203,097 B2
(45) Date of Patent: Feb. 12, 2019

(54) EXTRUDED CHANNEL PLATE AS BASIS FOR INTEGRATED FUNCTIONS

(71) Applicant: PHILIPS LIGHTING HOLDING B.V., Eindhoven (NL)

(72) Inventors: Rick Gerardus Nijkamp, Eindhoven (NL); Durandus Kornelius Dijken, Eindhoven (NL); Ties Van Bommel, Eindhoven (NL); Johannes Petrus Maria Ansems, Eindhoven (NL); Ludovicus Johannes Lambertus Haenen, Eindhoven (NL); Rifat Ata Mustafa Hikmet, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 8 days.

(21) Appl. No.: 15/508,965

(22) PCT Filed: Sep. 6, 2015

(86) PCT No.: PCT/EP2015/070307
§ 371 (c)(1),
(2) Date: Mar. 6, 2017

(87) PCT Pub. No.: WO2016/037950
PCT Pub. Date: Mar. 17, 2016

(65) Prior Publication Data
US 2017/0254517 A1    Sep. 7, 2017

(30) Foreign Application Priority Data

Sep. 8, 2014 (EP) .................................. 14183874

(51) Int. Cl.
*F21V 21/02* (2006.01)
*A01G 9/26* (2006.01)
(Continued)

(52) U.S. Cl.
CPC ................ *F21V 21/02* (2013.01); *A01G 9/20* (2013.01); *A01G 9/247* (2013.01); *A01G 9/26* (2013.01);
(Continued)

(58) Field of Classification Search
CPC .......... F21V 21/02; F21V 21/025; E04C 2/38; E04C 2/40; E04C 2/52; A01G 9/247
(Continued)

(56) References Cited

U.S. PATENT DOCUMENTS 4,136,377 A * 1/1979 Fohl .................... G03B 15/0442
                                                          362/13
4,945,675 A   8/1990 Kendrick
(Continued)

FOREIGN PATENT DOCUMENTS

CA        2476893 A     8/2003
DE     202006009651 U1   8/2006
(Continued)

*Primary Examiner* — Laura Tso

(57) ABSTRACT

The invention provides a multi-channel plate (100) comprising (i) a plurality of parallel arranged channels (1) and (ii) at least a light source (10) configured to provide light source light (11), wherein a first channel (110) includes a light transmissive part (12), wherein the light source (10) is configured to provide light source light (11) downstream from the light transmissive part (12) and external from the first channel (110) as a first lighting function, and wherein the multi-channel plate (100) includes a second channel (120), configured to provide an additional function different from said first lighting function.

15 Claims, 12 Drawing Sheets

(51) Int. Cl.
  *F21V 15/01*  (2006.01)
  *A01G 9/20*  (2006.01)
  *A01G 9/24*  (2006.01)
  *E04C 2/38*  (2006.01)
  *E04C 2/40*  (2006.01)
  *E04C 2/52*  (2006.01)

(52) U.S. Cl.
  CPC .............. *E04C 2/38* (2013.01); *E04C 2/40* (2013.01); *E04C 2/52* (2013.01); *F21V 15/013* (2013.01); *Y02A 40/274* (2018.01)

(58) Field of Classification Search
  USPC ........ 362/249.1, 249.02, 145, 217.1, 217.14, 362/362, 367
  See application file for complete search history.

(56) References Cited

U.S. PATENT DOCUMENTS

| | | |
|---|---|---|
| 6,354,714 B1 | 3/2002 | Rhodes |
| 7,572,027 B2 | 8/2009 | Zampini et al. |
| 7,887,216 B2 | 2/2011 | Patrick |
| 8,690,383 B2 | 4/2014 | Zampini et al. |
| 2011/0183368 A1 | 7/2011 | Chapman et al. |
| 2013/0163234 A1* | 6/2013 | Hsien ............... F21S 2/005 362/190 |
| 2013/0201690 A1 | 8/2013 | Vissenberg et al. |
| 2014/0104827 A1 | 4/2014 | Johns |
| 2014/0126197 A1 | 5/2014 | Dixon et al. |
| 2014/0198494 A1* | 7/2014 | Chin ............... F21S 2/005 362/217.14 |
| 2014/0233232 A1* | 8/2014 | Radermacher ......... F21S 2/005 362/249.01 |

FOREIGN PATENT DOCUMENTS

| | | |
|---|---|---|
| EP | 2515033 A1 | 10/2012 |
| FR | 2654188 A1 | 5/1991 |
| WO | 2011045711 A1 | 4/2011 |
| WO | 2013008179 A2 | 1/2013 |
| WO | 2013050913 A1 | 4/2013 |

\* cited by examiner

EXTRUDED CHANNEL PLATE AS BASIS FOR INTEGRATED FUNCTIONS

CROSS-REFERENCE TO PRIOR APPLICATIONS

This application is the U.S. National Phase application under 35 U.S.C. § 371 of International Application No. PCT/EP2015/070307, filed Sep. 6, 2015 which claims the benefit of EP Patent Application No. 14183874.8, filed on Sep. 8, 2014. These applications are hereby incorporated by reference herein.

FIELD OF THE INVENTION

The invention relates to a multi-channel plate, to a luminaire including such multi-channel plate, and to a horticulture construction comprising such multi-channel plate. The invention further relates to a kit of parts including such multi-channel plate, as well as to a method for producing such multi-channel plate. The invention also relates to a method for installing such multi-channel plates.

BACKGROUND OF THE INVENTION

Modular lighting systems are known in the art. WO2013050913, for instance, describes a lighting system comprising a plurality of modules, the modules respectively comprising: a housing provided with an exit window; at least one light source provided in the housing; wherein the lighting system further comprises: a controller arranged to drive light source(s); an electrical circuit arranged to connect light source(s) with the controller, the electrical circuit further comprising a first pair of electrical contacts provided in a first module and a second pair of electrical contacts provided in a second module, the first and second pair of contacts being arranged for a mutual electrical connection.

SUMMARY OF THE INVENTION

Luminaires or lighting modules in e.g. offices may be relative bulky and may be relative complicated to produce. Often the components used are thick and thus imply high material costs for different reasons, such as to prevent sagging, and/or to make the luminaire waterproof, and/or to make the luminaire impact resistant. To change functions, specifications, appearances, etc., the whole design nowadays has to be adjusted, involving multiple components.

Hence, it is an aspect of the invention to provide an alternative lighting module, which preferably further at least partly obviates one or more of above-described drawbacks, and which may especially easily be produced and which may occupy less space than state of the art luminaires or lighting modules.

In the prior art there is no integration of lighting functions (luminaires, light giving components) with other (non-lighting) functions like construction elements, water (liquid) tubing/plumbing, and electrical tubing/pipes. Luminaires are only used for lighting. Thus, there is no usage of concepts that reaps the benefits of integrating these functions like lower total cost and added functionalities/possibilities.

The present inventive concept is especially based on the integration of two or more functions in single (lighting) modules, which modules may optionally be coupled to each other, and which modules are especially based on single extruded (hollow) bodies, especially polymer bodies. In this way space may be used efficiently, materials may be used efficiently, and different functionalities can be combined within a single module. It may even be possible for the end user to choose the desired functionalities. Further, the present invention also provides the possibility to use modules as building elements in e.g. a house, an office, a plant, a hospitality area, etc., or for specific applications, such as horticulture applications, etc . . .

In a first aspect, the invention provides a multi-channel plate comprising (i) at least one first and at least one second parallel arranged channel and (ii) at least a light source configured to provide light source light to said at least first channel, which includes a light transmissive part and is configured to provide as a first lighting function said light source light downstream from the light transmissive part and to the exterior from said multi-channel plate, and wherein said at least one second channel is configured to provide an additional function different from said first lighting function.

These multi-channel plates are also referred to as multi-wall sheets, wherein the channels are referred to as cavities separated from each other by ribs, said ribs being the walls transverse to the main surfaces of the plate. The additional functions are attained by providing the multi-channel plate with additional elements/parts which enable and/or perform said additional function. The expression "multi-channel plate" in this context means that said plate has cross-sectional size, parallel to the main surfaces of the plate and transverse to the length of the first channel, of at least three times the cross section of the channel of the first and second channels having the largest cross section as measured parallel to the main surfaces of the multi-channel plate.

As indicated above, with such module one may integrate a lighting functionality with one or more other functionalities. For instance, the module may be used as building element. The module may also be used for thermal isolation. Additionally or alternatively, one or more second channels may be used to transport a fluid like air or water, which may optionally be used for heating or cooling e.g. a room adjacent to the module, or e.g. for irrigation. Additionally or alternatively, one or more second channels may be used for cables, like for ICT applications and/or for the light source, and/or may be used for sensors. Further, such one or more second channels may also be used for mechanical reasons, e.g. to bridge spaces and/or to introduce strength to a module, which may span a substantial area.

Especially, the module includes a multi-channel body which is especially obtainable by extrusion. Specific examples thereof are described in WO2013008179, which is incorporated herein by reference. For instance, the body may include a multiwall sheet, comprising walls, wherein the walls include a first wall, a second wall, and a transverse wall, wherein the first wall, the second wall, and the transverse wall extend longitudinally, and (optionally) a rib extending between adjacent walls. Hence, in a specific embodiment the first channel and second channel are part of a single polymer body. However, the invention is not limited to the embodiments described in WO2013008179.

Herein, the term "first channel" and "second channel" may also refer to a plurality of such channels. Hence, especially the multi-channel plate includes at least n parallel arranged channels, with n being an integer of at least 3, wherein the multi-channel plate includes n-1 or less first channels (but at least one first channel). Any first channel has a lighting function, and one or more second channels, especially any second channel, may in embodiments have no lighting functionality (see also below). The second channel(s) may have other functionalities, as indicated above. The term "lighting function" or "lighting functionality" indicates that from the first channel light source light may escape. The functionality of the channel(s) may optionally also be chosen by a user (including an installer). In this way, a module is provided that integrates functionalities and may occupy less space than when those functionalities would be provided with state of the art solutions. For instance, with the present invention ceiling systems may occupy less (vertical space) as the multi-channel plates may be used as ceiling system panels. The term "no lighting functionality" may at least indicate that the channel does not enclose a light source, but yet may be used for redistribution, redirection, modification and/or transportation of light source light.

The first lighting function provided by the at least one first channel may be attained by providing at least one light source, for example a multi-LED strip inside and essentially over the full length of said first channel. In an alternative embodiment said first lighting function may be attained by providing light sources, for example a LED light source or a laser diode at an opening at one end or at both ends of said first channel. In said alternative embodiment light source light generated by said light source is transported through the channel, for example by a solid, optionally patterned, light guide and subsequently homogeneously is coupled out of said first channel over the length of said first channel. Said homogeneous outcoupling may be attained by a specific scattering, refractive, diffractive or luminescent pattern on the light guide. Optionally the pattern is provided with a gradient or provided on specific sides of a light guide to couple light out into a preferred direction, for example in a direction perpendicular to the walls between adjacent channels, thus to further improve the homogeneity of light emitted through adjacent channels of the multi-channel plate. Further alternatively, a single light guide may be woven into the multi-channel plate through number of first channels, or a number of light guides may be used for that purpose.

In yet a further embodiment, the multi-channel plate comprises a repetitive structure of first channels having a first lighting functionality and second channels having at least one additional function different from said first lighting function, for example in that the second channels do not include light sources, or provide a second lighting function, for example emergency lighting of much lower brightness/light level than the brightness/light level of light provided by the first lighting function. With a repetitive structure, homogeneous lighting may be provided more easily. However, when there are more than two channels it is not necessary that there is a repetitive structure (of first and/or second channels). However, when there are more than about 8 channels, especially there may be a regular arrangement of first channels (e.g. channels 2, 4, 6 and 8 equipped with light sources). The number of first channels is not necessarily equal to the number of second channels (see also above). The term "parallel arranged channels" indicates that the channels are arranged in a parallel manner. Especially channel axes of such channels are aligned parallel.

The term "channel" especially refers to a structure which at least partly encloses an elongated cavity, such as a tubular passage or duct for e.g. a liquid. The channels herein may have a circular cross-section, but may also have other cross-sections, like square or triangular or hexagonal. Another term for the "multi-channel plate" may also be a "multi wall plate" or "multi-wall sheet", etc . . . One or more channels of the multi-channel plate may be open at the ends, but one or more channels may also be closed at one or both ends. Further, one or more channels, especially at the faces of the plate may have openings, optionally longitudinal openings, optionally over the entire length of the channel. The channels especially have lengths that are substantially larger than their width/height/diameter, such at least a 10 times larger length than one or more other dimensions selected from a width, a height, a diameter. Especially, the channels are closed over their entire length, i.e. the channel wall(s) circumvent the channel cavity. The term "circumvent" does not necessarily refer to a round circumvention. The channels of the multi-channel plate are especially arranged parallel. Hence, channel axes are especially aligned parallel. In addition, however, one or more channels may include openings in the walls (that are configured parallel to the channel axes), especially walls at a front face. In this way, e.g. fluid may escape through orifices (see also below).

The multi-channel plate is not necessarily flat. The multi-channel plate may be curved and/or may have curved surfaces. Further, the multi-channel plate may include indentations and/or protruding parts. Indentations may e.g. be used to protect parts, e.g. transmissive parts or nozzles (see also below). The overall feature of the multi-channel plate is however plate like, i.e. a height and a width that are each smaller than a length of the multi-channel plate, with the width being significant larger, for example at least 4 times, the height of the plate. Especially the length of the multi-channel plate is at least 10 times the width and/or height of the multi-channel plate. Optionally, the one or more channels may have different lengths; this may e.g. be used for coupling multi-channel plates to each other or for other functionalities.

The term multi-channel plate or multi-wall sheet may also refer to a multi-channel plate including layers of channels. Hence, the multi-channel plate may include an arrangement of multiple channels (parallel) in 1D, but may optionally also include an arrangement of multiple channels in 2D. Also in the latter embodiment, the channels will especially be arranged parallel. Also the layers will especially be arranged parallel.

The channels of the multi-channel plate do not necessarily have the same cross-section. The cross-sections may differ in geometry (see also above), but even channels having the same geometrical cross-section shape may differ in circumferential length. Hence, though the channels will in general have substantially the same length (i.e. substantially the same length as the multi-channel plate), but the cavity dimensions (i.e. width/height/diameter of the channel) may differ. By way of example, the multi-channel plate may include three channels, with two having a square cross-section, and arranged adjacent, and a further channel having a cross-section substantially twice the square cross-section (i.e. rectangular), and arranged on top (or below) the two channels. All kind of arrangements (that is physically allowable) are possible.

The thickness of the walls may vary over the length and/or width and/or height of the multi-channel plate. For instance, part of the ends of the multi-channel plate may be thicker than the part in between the ends. In this way, e.g. a light weight multi-channel plate may be provided. For instance, the process may include using an adjustable extrusion mold, to vary dimensions of the multi-channel plate over its length.

The multi-channel plate may include a light transmissive part; especially first channel may include a light transmissive part. The term "light transmissive part" may optionally refer to an opening, i.e. a window without material, but especially refers to a window including solid material but being transmissive for light source light. The light transmissive part may especially be transmissive for at least part of the light source light.

As extrusion may also be performed with more than one component, the composition of the material of the multi-channel plate, i.e. of the walls (the body) may vary dependent upon the position at the multi-channel plate. Therefore, the term "extrusion" and similar terms may also refer to co-extrusion, etc . . .

Hence, optionally parts of the multi-channel plate may include light transmissive material whereas other parts may include non-transmissive material. Hence, the multi-channel plate, especially the body, includes a light transmissive polymer body. Hence, the walls may in embodiments include light transmissive polymer material. For transmissive polymeric materials one or more materials may be selected from the group consisting of e.g. PE (polyethylene), PP (polypropylene), PEN (polyethylene naphthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), (PETG) (glycol modified polyethylene terephthalate), PDMS (polydimethylsiloxane), and COC (cyclo olefin copolymer).

The term "transmissive" may refer to "transparent" or "translucent". If desired, translucency may be introduced by the specific (polymer) starting material used and/or may be provided after extrusion, such as by sand-blasting or other methods known in the art.

Alternatively, the body may include another material than polymer. For instance, the body may also include a glass material. Hence, in an embodiment the multi-channel plate includes glass walls.

Further, optionally at least part of the multi-channel plate may include a luminescent material, especially one or more walls of the first channel. In combination with the light source, the luminescent material can wavelength convert at least part of the light source light. For instance, the light source may include a blue LED and the luminescent material may include a wavelength converter configured to convert at least part of the blue light into one or more of green, yellow, orange and red light. For instance, the luminescent material in combination with the light source may provide white light (which may optionally also be color tunable by controlling the intensity of the light of the light source). Hence, in an embodiment (at least part of) the extrusion starting material may include a luminescent material. Therefore, in a specific embodiment at least part light transmissive part comprises a luminescent material configured to ("wavelength") convert at least part of the light source light into light of another wavelength. The luminescent material may be embedded in the light transmissive part and/or may be coated on such part (downstream or upstream thereof) and/or may be provided as foil, etc.

Further, optionally at least part of the multi-channel plate may be white or colored. For instance, (at least part of) the extrusion starting material may include a pigment, such as a white or colored pigment. Optionally, different parts may include different colors. Also combinations of one or more parts with luminescent material and one or more parts with a white pigment or a colored pigment, etc. may be used.

Further, optionally one or more parts of the multi-channel plate may include an UV blocking material. For instance, when construing a horticulture construction (see also below) or other assembly, parts may include such UV blocking material, especially parts where light for horticulture is less relevant.

Further, optionally at least part of the external surface of the multi-channel plate may comprise a coating. This coating may be a pigment containing coating and/or a luminescent material containing coating. Alternatively or additionally, the coating comprises and anti-scratch coating and/or an anti-reflection coating. In an embodiment, the coating may include a luminescent material (see also above). Further, a foil may be provided to at least part of the external surface of the multi-channel plate. Such foil may have one or more functionalities as describe here before for the coating.

The first channel has an optical function and may include amongst others one or more light sources. In a specific embodiment the first channel includes optics integrated with a channel wall, and especially being part of a single polymer body. An advantage of extrusion technology is that such structures may easily be provided during the extrusion process. Here, the term "optics" may refer to one or more of a lenses, a micro lenses, a mirror face (e.g. a wall having mirror functionality), and a diffusor. Optionally, the term "optics" may also refer to an optical filter, as the wall may also include an optical filter, such as by including an absorbing species in (a component) of the extrusion starting material. Of course, optics may also be provided after production of the multi-channel plate body. Note that though each first channel has a lighting function, the lighting function may differ. Also the optional optics in first channels may differ between first channels.

The term "light source" may also relate to a plurality of light sources, such as 2-1000 (solid state) LED light sources, though even more light sources may be available. Hence, the term LED may also refer to a plurality of LEDs. In a specific embodiment, the light source comprises a solid state LED light source (such as a LED or laser diode). In a specific embodiment, the light source includes a multi-LED strip configured within the first channel. Such LED strip may be included in the multi-channel plate after extrusion of the body.

In a specific embodiment, the first channel includes a sub-channel with a cross-section smaller than a cross-section of the first channel, configured to host the at least one light emitting part, for example the multi-LED strip. In this way, the light emitting part, for example LED strip, may be slided in the sub-channel and may be kept therein. The dimensions of the sub-channel and the light emitting part are especially adapted to each other. The sub-channel may include (again) a transmissive part (see above).

The light source may be associated with any part of the wall(s) of the multi-channel plate. The multi-channel plate may be configured as down lighter and/or as uplighter, and optionally even also (or alternatively) as edge lighter. Together with optional optics, in principle any configuration of the light source is possible to provide the desired light and desired light directionality.

In an embodiment the multi-channel plate is characterized in that said at least one second channel is configured to provide at least one additional function different from said first lighting function selected from the group of functions consisting of photovoltaic cell, fluid transportation means for fluids like fluid-tight tubes or connectors or nozzles, suspension means, electric equipment like electric cables, ICT equipment, detectors/sensors, circuitry, electric power sources, electrical connectors, charge controller, a battery system, and an inverter. The second channel(s) especially do not have a lighting function and/or especially do not include a light source. However, optionally one or more second channels may have a lighting function but do not include a light source. This may be the case when the first light source and first channel are configured to provide at least part of the light source light into a second channel. In such embodiment, the second channel may also be used to distribute light and have a lighting function. However, especially in embodiments at least one second channel does not have a lighting functionality. In general this may imply that one or more walls of the second channel are transmissive, at least for transmission of light source light into the second channel and also for transmission of light source light out of the second channel. The use of second channels to also provide light may allow an (even) better distribution of the light and a (more) homogenous lighting from the multi-channel plate.

As indicated above, one or more second channels may be used to transport a fluid like air or water, which may optionally be used for heating or cooling e.g. a room adjacent to the module, or for other applications (like irrigation via openings with optionally nozzles). Additionally or alternatively, one or more second channels may be used for cables, like for ICT applications and/or for the light source. Further, such one or more second channels may also be used for mechanical reasons, e.g. to bridge spaces and/or to introduce strength to a module, which may span a substantial area. Hence, such second channel(s) does not necessarily comprise light transmissive wall, or walls that are entirely transmissive for light source light. Hence, in further embodiments, at least part of the second channel is not transmissive for light. For instance, for esthetical reasons one may choose one or more channels not to be transparent or translucent for light source light. In this way, the use of such channel for cables may be hidden for a viewer. Hence, when a plurality of second channels are available, these channels may provide different functionalities, respectively.

As indicated above, one or more second channels may be used to host photovoltaic cells, commonly referred to as solar cells. Combination of day-light for illumination while generating electricity is important in various lighting applications. Hence, an embodiment of the multi-channel plate comprises solar cells provided in its second channel(s) and providing a conversion of sun-light into electrical current. Such devices can be used to power batteries which electric energy can in turn be used to power electronic devices such as LEDs. Typically, solar cells are placed on a back plate, and often, the solar cell manufacturer mounts a glass cover plate over the assembly to protect the cells against water, moisture and dirt. Solar cells can also be combined with solar concentrators. Depending on the application solar cells, light convertors and solar concentrators can be combined with LEDs to obtain desired effects in various applications. For example, in horticulture it is relevant to have day-light with excess blue, red and IR light for the plant growth. On the other hand, in day-light illumination it is desired to supplement the day-light entering a space with adjustable LED light to reach the desired color temperature. However, for various applications such as verandas, conservatories and vertical glazing it is desired that solar cell assemblies are still transparent to allow the transmission of day/sunlight. For this purpose, the multi-channel plate comprises a plurality of solar cells into second channels next to first channels of the multi-channel plate which do not include a solar cell. The position of solar cells can be various, for example:

The solar cells can also be positioned such that the transparency of the assembly is angle depend. This might be interesting for e.g. roof applications.

The solar cells can also be positioned under an angle.

The solar cells might also be positioned perpendicular to the channel plate.

In order to decrease the number of solar cells (and thus cost) part of the wall may be made diffuse reflective. This diffusive layer is arranged to diffuse at least part of the light and redirect it to the solar cells in the channel plate.

In another embodiment, the channel plate with solar cells might comprise at least one light redirecting structure. This structure is arranged to redirect light towards the solar cells in the channel plate.

In order to decrease the area of solar cells (and thus cost) an optical element might be integrated to focus light on the solar cell.

In order to increase the light harvesting properties of the system and reduce the surface area of the solar cells (and thus cost) we suggest that the channel plate comprises a transparent luminescent material. The luminescent channel plate is collecting radiation over a large area, converting it by luminescence and directing the generated radiation via light outcoupling means (e.g. a diffuse reflector) to a solar cell positioned in the channel plate.

In the same way, part of the multiwall panel may comprise luminescent material and convert light which is subsequently directed to a solar cell.

Instead of solar cells one can also include solar concentrators.

Part of the converted light might also be directed towards the plants e.g. in a greenhouse in an efficient way and with an optimized spectrum.

It is also be possible to flip the linear solar cells inside a channel, such that the individual solar cells are always facing the sun (as much as possible). Step-wise flipping can be done with small electric actuators.

The channel plate with integrated solar cells might also comprise other electronics such as a charge controller, a battery system, and an inverter. These components might be integrated as well in the channel plate itself.

In yet a further aspect, the invention provides a luminaire comprising the multi-channel plate as defined herein. Such luminaire may suspend from a ceiling, or may be associated to a wall, etc. Such luminaire may optionally also include a plurality of multi-channel plates. The multi-channel plate may provide lighting and the structure of the multi-channel plate may provide mechanical strength to an optionally relatively large or extended luminaire. The luminaire may of course also include a plurality of multi-channel plates.

In yet another aspect, the invention provides a horticulture construction including a plurality of multi-channel plates as defined herein, wherein one or more multi-channel plates may especially be comprised by an infrastructure for providing light and optionally one or more of water and food to a plant included in the horticulture construction. As will be further explained below, multi-channel plates may optionally be connected. Hence, the horticulture structure may make use of the channels to heat horticulture, to provide water to the horticulture, and to provide light to the horticulture. In a simple way (see also below), elements may be connected to a unit or assembly substantially consisting of multi-channel plates. For instance, with the multi-channel plates "city farming" may be applied. City farming is a new and innovative technique in horticulture. This cultivation process is developed to increase production on relatively small areas. Due to several techniques like multilayer cultivation and the LED modules and/or light recipes, it is possible to reduce costs, increase production and grow more efficiently. Hence, with the multi-channel plates (small) greenhouses or greenhouse units may be built.

In a specific embodiment of the multi-channel plate of the invention, the multi-channel plates can be arranged as larger unit (see also above). Channels of different multi-channel plates in line with each other may be e.g. used to transport fluids or to guide cables, etc. Hence, in an embodiment the multi-channel plate is configured to be able to be connected (with or without connectors (see also below)) to another multi-channel plate of the same type.

For such assemblies of multiple multi-channel plates one may further optionally need connectors. Hence, in yet a further aspect the invention also provides a kit of parts including a multi-channel plate, especially a plurality of multi-channel plates, as defined herein, and one or more connectors, wherein the one or more connectors are configured to connect installed adjacent multi-channel plates to each other. In an embodiment, the term "kit of parts" refers to a package including one or more multi-channel plates, especially multiple multi-channel plates, such as at least two, and one or more connectors. In yet another embodiment, the term "kit of parts" may also refer to the installed combination of multiple multi-channel plates, such as at least two, and one or more connectors, with the connectors connecting the multi-channel plates.

In a specific embodiment, the one or more connectors are configured for providing a fluid tight connection between a second channel of a first multi-channel plate and a (second channel of a) second multi-channel plate. The connectors may thus be used to connect two (or optionally more) adjacent multi-channel plates, but may in a specific embodiment include the functionality to provide a fluid tight connection between one or more sets of channels of adjacent multi-channel plates. Note that it may not be necessary to connect all channels fluid tight. In general, the first channel(s) of adjacent multi-channel plates may not necessarily be connected fluid tight. In an embodiment, the term "fluid tight" refers to gas tight. In yet another embodiment, the term "fluid tight" refers to liquid tight, especially water tight.

The connectors described above especially are connectors that may be used to connect two (or more) multi-channel plates. However, optionally and additionally, multi-channel plates may also be connected with male-female connection parts associated with the multi-channel plates. For instance, the multi-channel plate may include a first end with a male connection part and a second end with a female connection part. In this way, multi-channel plates may be connected via male-female connections, whereby a male connection part may be retrieved by a female connection part. Also such connection may in embodiments be configured to be fluid tight. Hence, in embodiments the multi-channel plate includes a first end with a male connection part and a second end with a female connection part, wherein one or more of these parts are configured to provide a (fluid tight) connection between (a second channel of) a first multi-channel plate and (a second channel of) a second multi-channel plate.

It is not necessary that the adjacent multi-channel plates are arranged in line with each other. Optionally, they may be arranged under an angle unequal to 180°. Hence, in a specific embodiment at least one of the one or more connectors is configured to connect adjacent multi-channel plates under an angle unequal to 180°. Characteristic angle will be 30°, 45°, 60°, and 90° as well as the equivalent oblique angles (of these acute angles).

In yet a further aspect, the invention also provides a method for producing a multi-channel plate as defined herein, the method comprising:

a. providing an extrusion starting material;
b. multi-channel extruding the extrusion starting material into a multi-channel plate ("body"); and
c. providing a light source to the multi-channel plate.

The extrusion starting material may e.g. include a molten polymer and/or monomers that may react to a polymer. Of course, the starting material may include further materials like e.g. colorants, preservatives, diffusor particles, etc. Further, the term "extrusion starting material" may thus refer to a mixture of materials. Mixing may optionally also be done during extrusion, such is via an intermediate inlet in the extruder. The term "extrusion starting material" may also refer to a plurality of such materials, for instance for multi-component extrusion. The result of the first two stages is the body; the result of the last stage is the multi-channel plate, i.e. the body including the light source. Note that preceding, and/or intermediate and/or subsequent stages may include in the process, such as an intermediate cooling or heating, sand blasting of a part of the body, etc. Alternatively, the extrusion starting material includes (molten) glass material. Other methods than extrusion to provide the multi-channel plate may also be used.

Optionally, part of the total number of channels is created after extrusion. The multi-channel plate may optionally be configured in a multi-stage process, wherein part of the walls (or ribs) are introduced after extrusion, e.g. by sliding the walls into an extruded hollow body.

In yet a further aspect, the method may also include arranging a first multi-channel plate and a second multi-channel plate adjacent to each other, and configuring at least a second channel of the first multi-channel plate and at least a second channel of the second multi-channel plate in a fluid tight connection, optionally with the herein described connector(s). Of course, other connections and/or arrangements can be made. This is an example of a specific embodiment wherein one or more second channels may be used to transport a fluid. However, other functionalities may also be included or used, wherein a fluid tight connection may not be necessary, and wherein another type of connection may be applied.

In yet another embodiment, adjacent light sources may functionally be coupled, e.g. to provide a lighting system. Hence, in a further embodiment the light source of the first multi-channel plate is electrically connected to the light source of the second multi-channel plate. Optionally, the individual light sources, or even subsets of one or more LEDs within a LED strip, may individually be controlled. For instance, one or more of intensity and color of the light of the light source(s) can be controlled. For instance, a LED strip may include LEDs configured to provide light with different spectral wavelength distributions (such as blue, green, yellow, and red (see also above)).

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, sky lighting, roofing, glazing, veranda lighting, or LCD backlighting, etc.

As indicated above, the lighting unit may be used as backlighting unit in an LCD display device. Hence, the invention provides also a LCD display device comprising the lighting unit as defined herein, configured as backlighting unit. The invention also provides in a further aspect a liquid crystal display device comprising a back lighting unit, wherein the back lighting unit comprises one or more lighting devices as defined herein.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

Figure 1A:
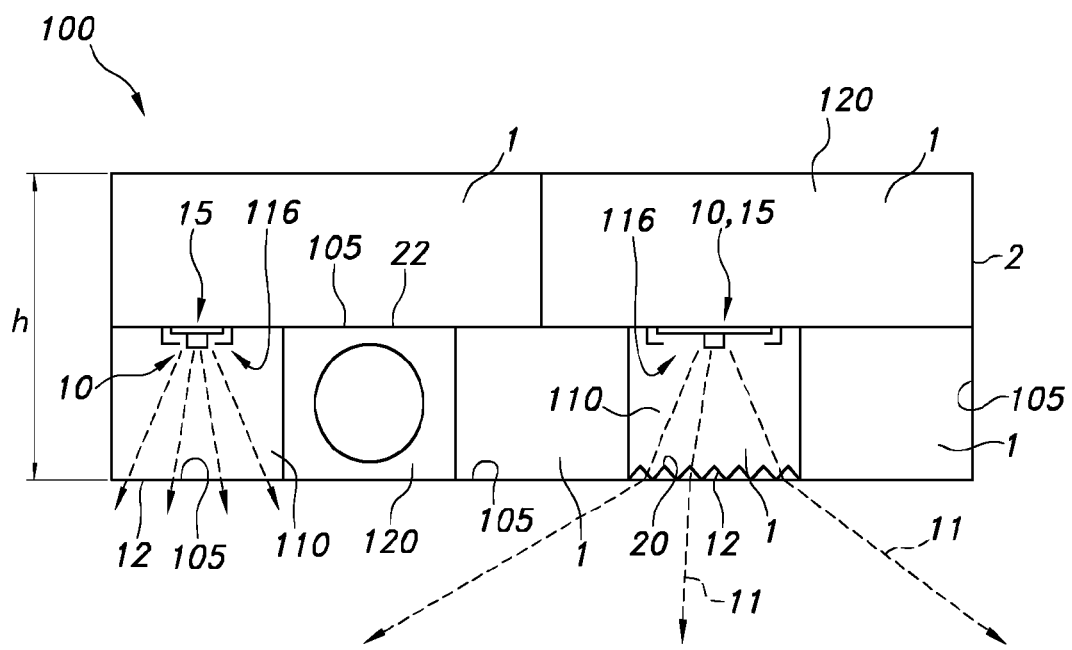
FIG. 1A-1B schematically depict some aspects of the multi-channel plate.

FIG. 1A schematically depicts an embodiment of multi-channel plate 100 comprising (i) a plurality of parallel arranged channels 1 and (ii) at least a light source 10 configured to provide light source light 11. Here, by way of example the module includes two layers with different channels. Channels including light sources 10 are indicated first channels 110; the other channels (not including light sources 10), which may have various functionalities, are indicated second channels 120. Here, the first channel 110 includes a light transmissive part 12. The light source 10 is configured to provide light source light 11 downstream from the light transmissive part 12 and external from the first channel 110; the second channel 120 does not including a light source 10. The term "downstream" does not necessarily indicate that in use the light is directed downwards, it only indicates that light is found downstream from an item or position. Although the channel axes are not drawn (for the sake of clarity), the channels of the multi-channel plate are arranged parallel in this schematically depicted embodiment (and also in the other drawings). Here the height (h) is the height of the two layers.

Here, by way of example a two layer multi-channel plate is depicted. However, also single layer multi-channel plates may be applied (see also below).

Examples of such plates are e.g. the multiwall polycarbonate sheets Sunlite® of Palram. The plates herein, such as from Palram, may for instance be a "cellular polycarbonate structure". The plates are lightweight sheets with high impact strength and good thermal insulation. Further, they can provide high light transmission. They can substantially block all UV emission. They can be used for architectural roofing and glazing, for skylights and sidelights, for conservatories, for covered walkways, for displays, signage and decorations, for industrial roofing and industrial glazing, for residential roofing and residential glazing, for covered swimming pools, for horticultural greenhouses, etc.

As shown in FIG. 1A the first channel 110 may include optics 20 integrated with a channel wall 105 and optionally being part of a single (polymer) body 2. The optics may e.g. have the function to control the beam width (see the differences in beams). Further, by way example the light source 10 is depicted (see also FIG. 2A) to include a multi-LED strip 15 (see further also below) configured within the first channel 110. To this end, the first channel 110 may e.g. include a sub-channel 116 with a cross-section smaller than a cross-section of the first channel 110, configured to host the multi-LED strip 15 (see also FIG. 2A). The channels 110,120 include cavities circumferentially enclosed by one or more channel walls 105. Hence, the multi-channel plate 100 may also be indicated as multi-wall module or multi-wall device, or multi-wall sheet. Reference 22 indicates by way of example a non-transmissive part. The round element in the one but left channel (second channel 120) on the lower row may e.g. represent a cable or tube. In FIG. 1A, schematically the light is drawn in downward directions. However, alternatively or additionally, light may also be directed upwards. Note that light source light 11 is found downstream of the light transmissive part(s) 12.

Referring to FIG. 1A, alternatively all lower channels (here the 5 channel layer) may include a lighting function, with the upper channels (here the two channel layer) including another function, such as one or more of tubing, wiring, housing electrical components, etc. In this way, homogeneous lighting may easily be provided, with the electronics "behind" the first channels 110.

Figure 1B:
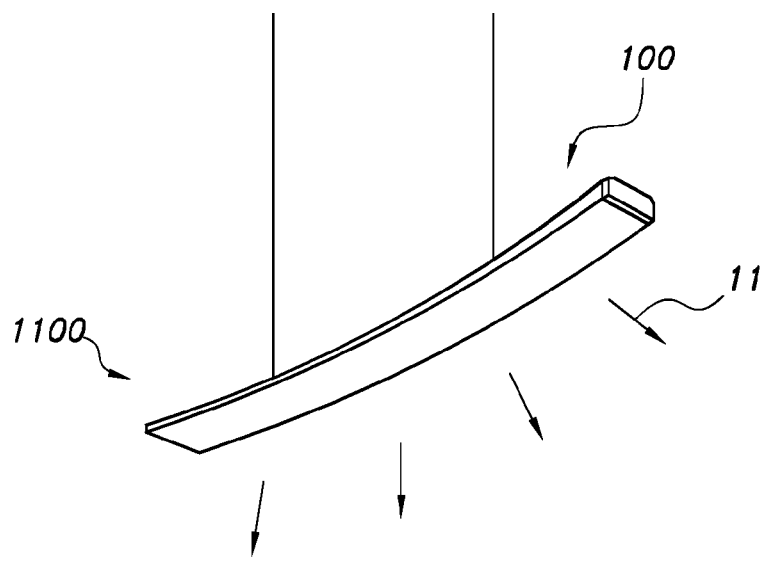

FIG. 1B schematically depicts a luminaire 1100, which comprises one or more multi-channel plates 100.

Figure 2A:
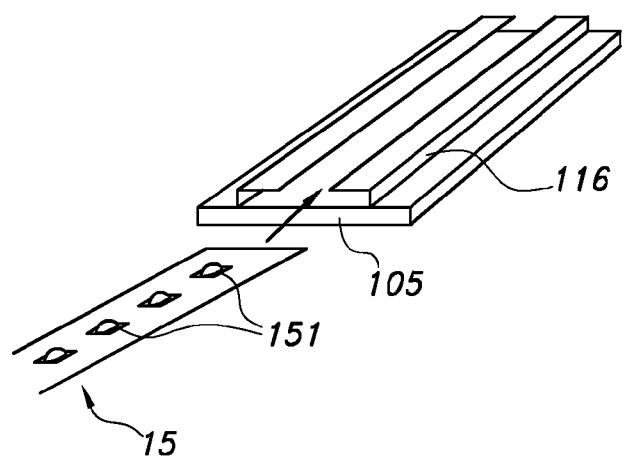
FIGS. 2A-2E schematically depict some aspects and variants of the multi-channel plate.

FIG. 2A schematically depicts in more detail a sub-channel 116 with a cross-section smaller than a cross-section of the first channel 110, configured to host the multi-LED strip 15. The arrow indicates how the LED strip 15 may be slided into the sub-channel 16. References 151 indicate the respective LED light sources.

Figure 2B:
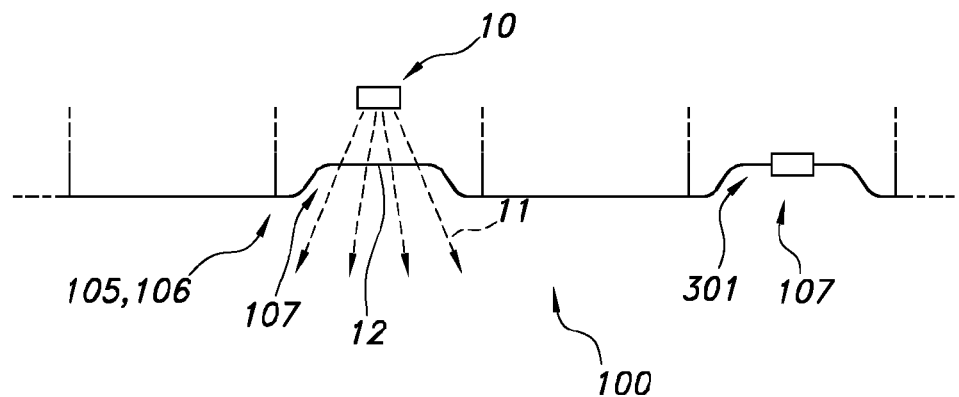

FIG. 2B schematically depicts embodiments wherein a face, such as a front face 106, is not entirely flat, but may include a recession 107. This may be for several reasons.

For instance, assuming a first channel 110 such recession may prevent scratching of the surface of the channel wall or the transmissive part 12. Assuming a second channel, such recession 107 may protect extending elements, such as e.g. an outlet 301. For instance, this outlet may be used as sprinkler or may be used to irrigate horticulture. Optionally, the outlets include nozzles. For instance, openings may be provided in the multi-channel plate and nozzles may be arranged to these openings. Such nozzles may especially be designed to provide an irrigation function or fire extinguishing function. Nozzles may be arranged to openings after the production of the multi-channel plate body.

Figure 2C:
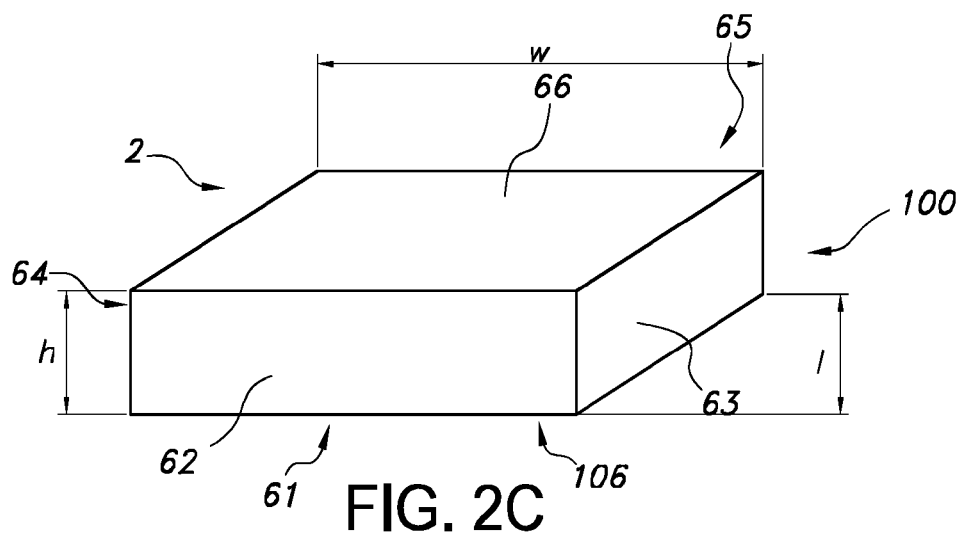

FIG. 2C very schematically depicts the multi-channel plate, having a first face 61/front face 106, and an oppositely arranged second face 66. Faces 62, 63, 64 and 65 indicated edges bridging the front face and the second face 66. Note that the term "front face" does not necessarily imply that all light escapes from this face. It may well be that part of the light of the light source(s), or even all light, (also) escapes from the edge(s). The distance between the front face 61/106 and the second face 66 is herein indicated as height (h). The distance between the faces 62 and 65 is herein indicated as the length (l) and the distance between the faces 64 and 63 is herein indicated as width (w). For a single multi-channel plate 100, in general l>h and l>w, especially l>>h and l>>w. Further, in general the width (w) will be larger than the height (h).

Figure 2D:
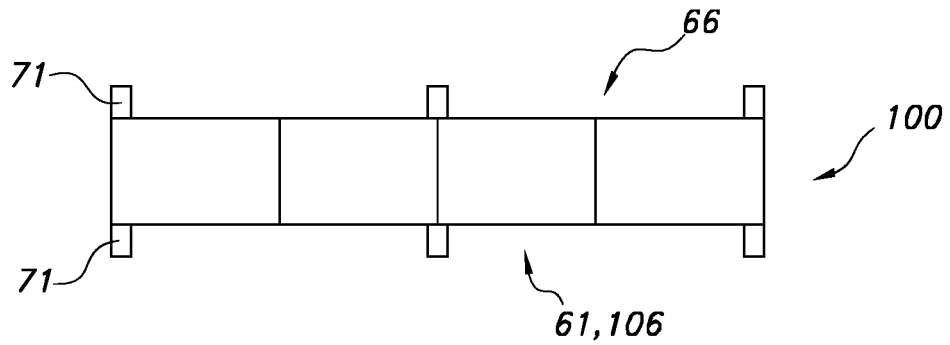

FIG. 2D schematically depicts that the multi-channel plate 100 may optionally (also) include protruding parts 71. This may be used to arrange adjacent multi-channel plates 100 at a distance from each other. For instance, the space between the protruding parts may be filled with an item, like ground and a plant (for horticulture application).

Figure 2E:
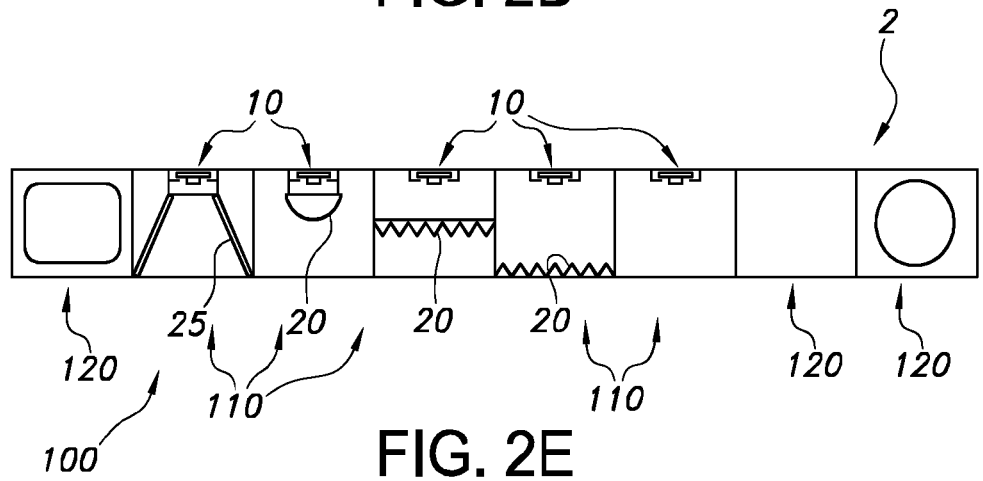

FIG. 2E very schematically depicts a number of applications that may be included in the multi-channel plate 100. From left to right a driver is depicted, a light source with inserted optics 25 (i.e. not extruded), like mirrors, a light source with a extruded dome as optics 20, Fresnel optics as optics 20 obtainable with the extrusion process (two examples), an example of a light source without further optics, an empty second channel, and a second channel including a cable. Of course, other options may also be possible (see above).

Figure 3A:
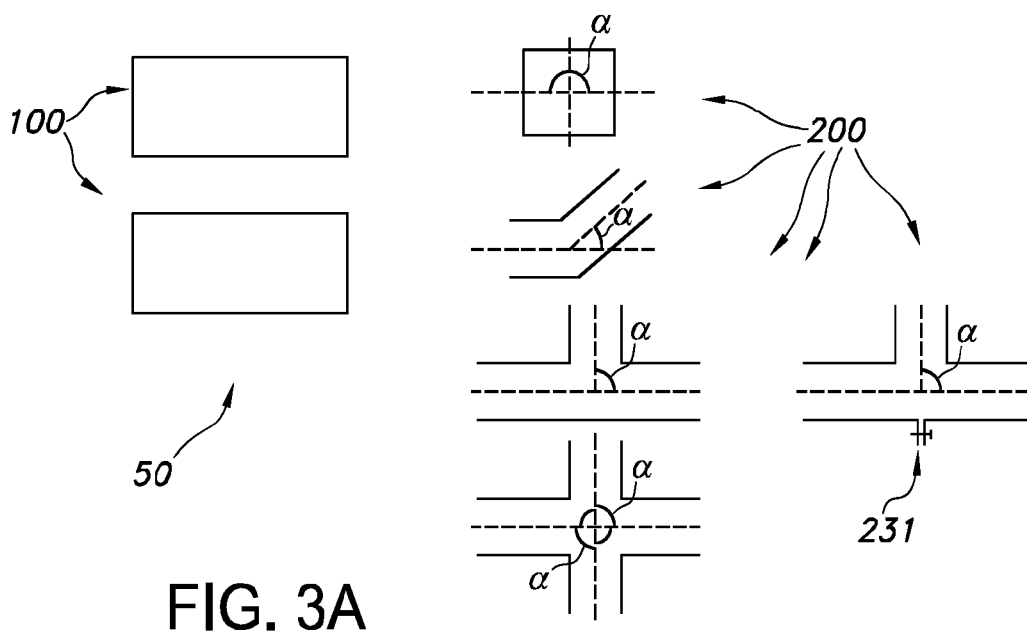
FIGS. 3A-3C schematically depicts some aspects and variants of a kit or parts, connectors, and other aspects of the multi-channel plate and applications thereof.

FIG. 3A schematically depicts a kit of parts 50, including at least two multi-channel plates 100, and by way of example a plurality of connectors 200. Here, by way of example a plurality of different connectors are depicted, each allowing a different connection, e.g. connecting two multi-channel plates in line with each other or under an angle a, or connecting 3 or 4 multi-channel plates, e.g. under right angles, and a connector including by way of example an inlet 231 or outlet, e.g. for introducing or removing a liquid. Connectors may optionally also include electrical connections (e.g. to electrically connect adjacent light sources).

Figure 3B:
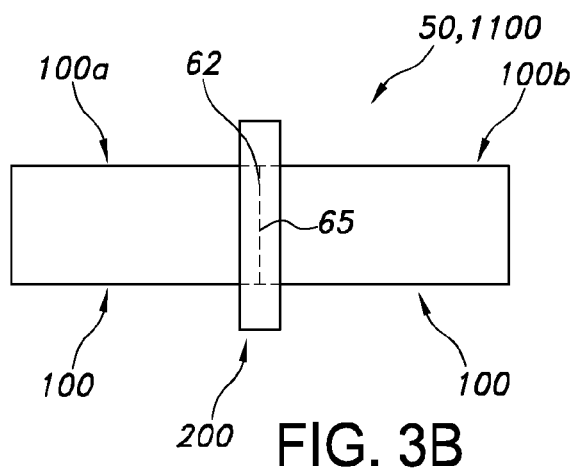

FIG. 3B schematically depicts a set of two multi-channel plates 100*a* and 100*b*, which are connected via connector 200. Here, the multi-channel plates are arranges in line.

Figure 3C:
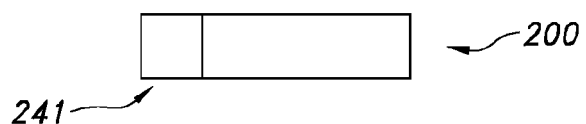

FIG. 3C very schematically indicates that a connector 200 may be used to provide a fluid tight connection 241 e.g. only for a limited set of channels.

Figure 4:
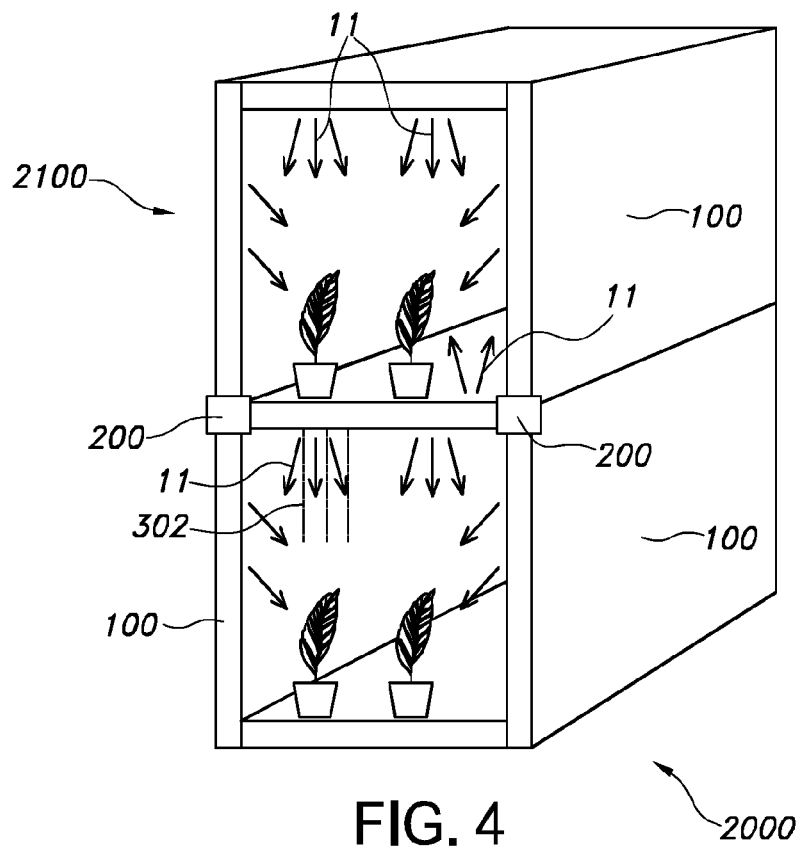
FIG. 4 schematically depicts an embodiment of a horticulture application.

FIG. 4 schematically shows how the multi-channel plates may be assembled to a horticulture construction 2100, including a plurality of multi-channel plates which are coupled to each other and form areas wherein a horticulture item such as a plant, etc., can be provided with light and optionally other features such as water (see references 302 indicating water or irrigation). Optionally, part of the light may also be directed upwards, to illuminate leaves from below.

Figure 5A:
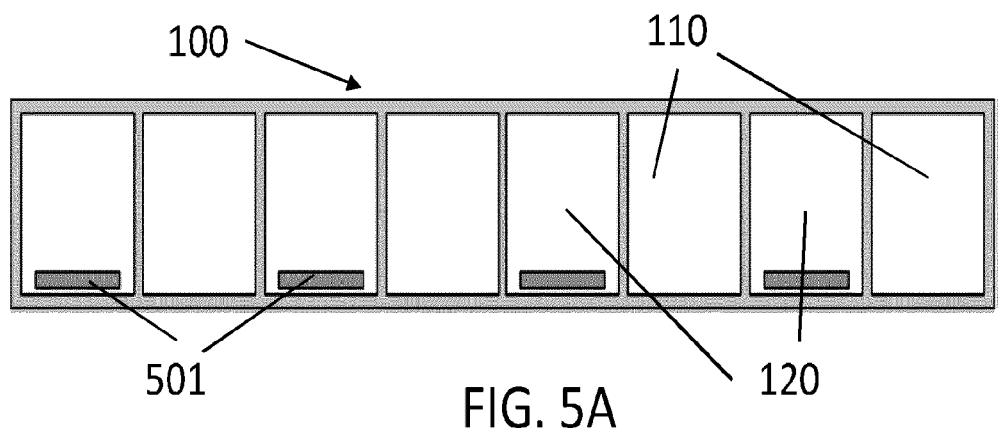
FIGS. 5A-5H, 5J-5N, 5P schematically depicts various embodiments of multi-channel plates comprising photovoltaic cells, and FIGS. 6A-6H, 6J-6M schematically depicts various arrangements of light emitting parts in the multi-channel plate.

FIG. 5A schematically depicts a channel plate 100 which comprises a plurality of photovoltaic cells (solar cells) 501 in second channels 120 wherein the channel plate includes at least one first channel 110 which does not include a solar cell and via which the first lighting function could be provided.

Figure 5B:
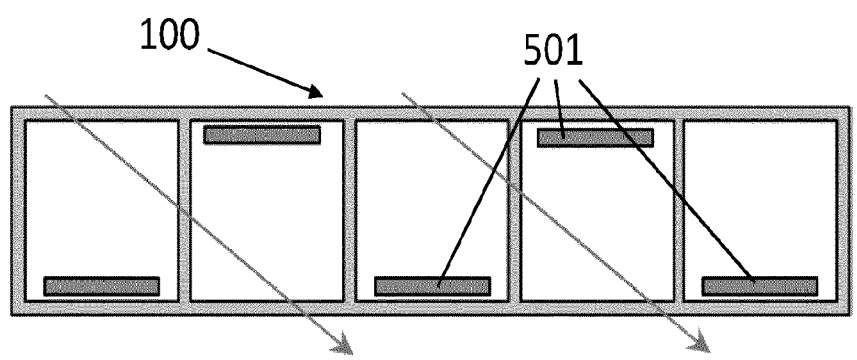

FIG. 5B schematically depicts a channel plate 100 which comprises solar cells 501 which are positioned such that the transparency of the assembly is angle depend. This might be interesting for, for example, roof applications.

Figure 5C:
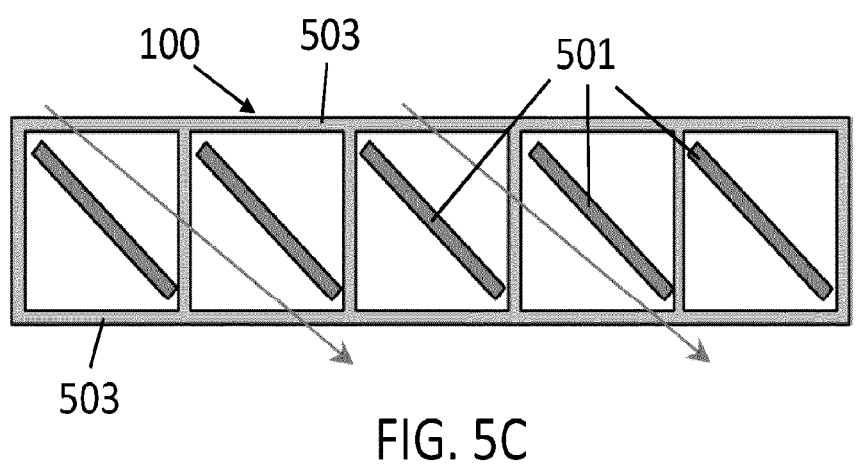

FIG. 5C schematically depicts a channel plate 100 which comprises solar cells 501 which are positioned in angled position with respect to the main surfaces 503 of the multi-channel plate such that the transparency of the assembly is angle depend as an alternative to the embodiment of FIG. 5B. This might be interesting for, for example, roof applications.

Figure 5D:
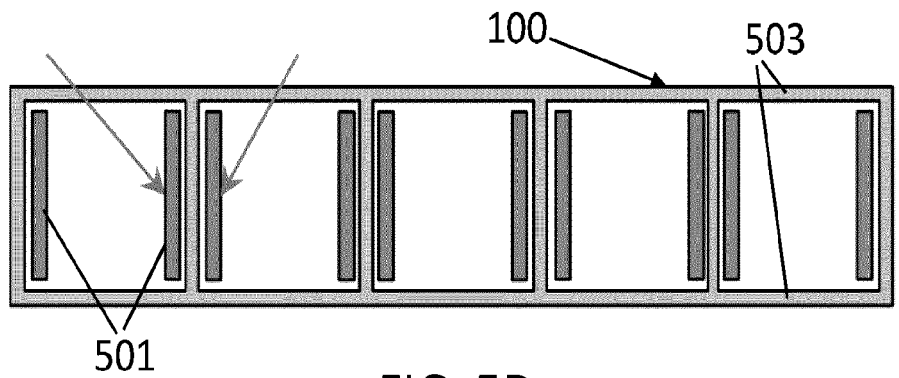

FIG. 5D schematically depicts a channel plate 100 which comprises solar cells 501 positioned perpendicular to the main surfaces 503 of the multi-channel plate.

Figure 5E:
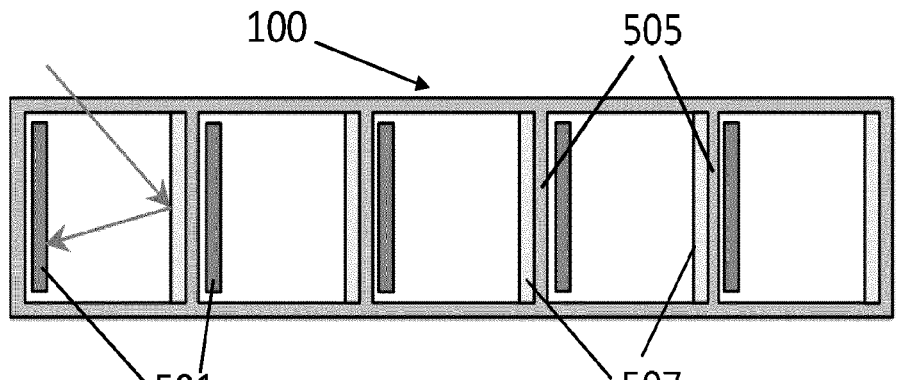

FIG. 5E schematically depicts a channel plate 100 which comprises at least walls (or ribs) 505 which are over at least over a part diffuse reflective in order to decrease the number of solar cells 501 (and thus cost). Thereto said walls are provided with a diffusive layer 507 to diffuse at least part of the light and redirect it to the solar cells in the channel plate.

Figure 5F:
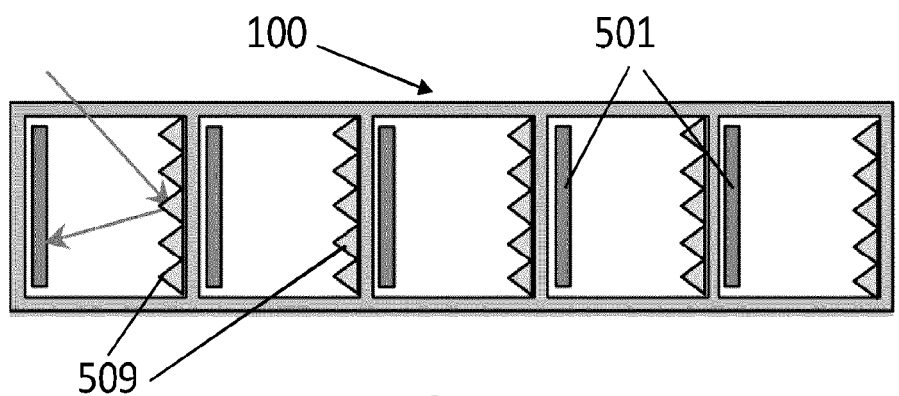

FIG. 5F schematically depicts a channel plate 100 which comprises at least one light redirecting structure 509. This structure is arranged to redirect light towards the solar cells 501 in the channel plate.

Figure 5G:
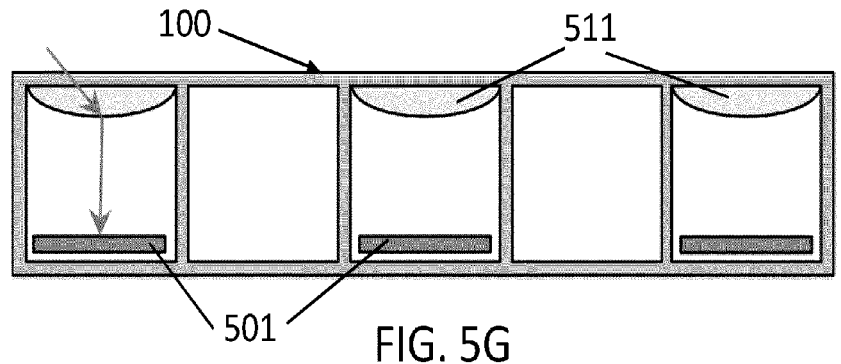

FIG. 5G schematically depicts a channel plate 100 which comprises integrated optical elements 511 to focus light on the solar cell 501 and thus to decrease the area of solar cells.

Figure 5H:
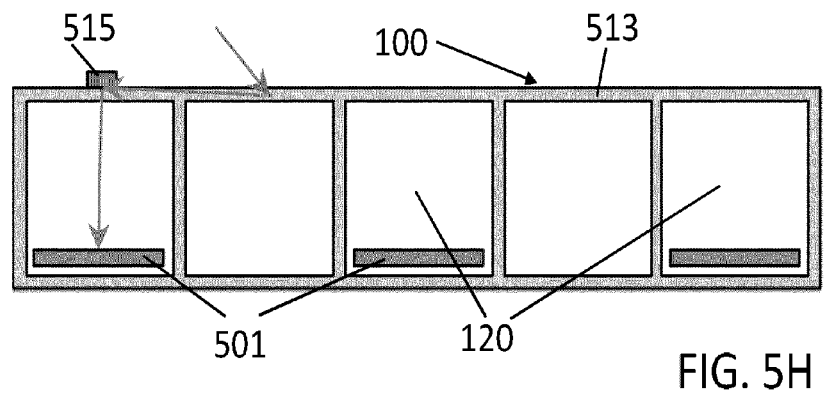
Figure 5J:
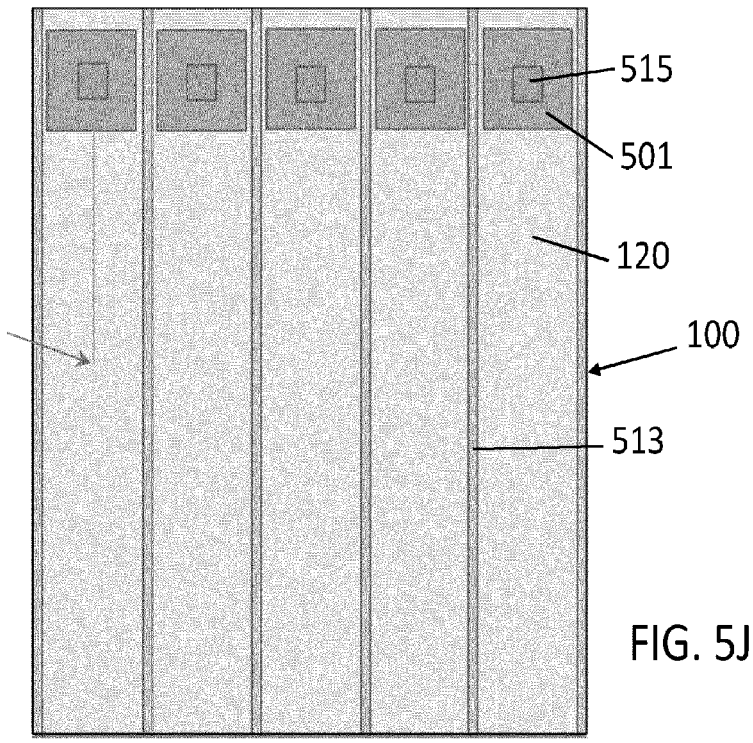

FIG. 5H and 5J schematically depicts a channel plate 100 which comprises a transparent luminescent material 513. The luminescent channel plate is collecting radiation over a large area, converting it by luminescence and directing the generated radiation via light outcoupling means 515 (e.g. a diffuse reflector) to a solar cell 501 positioned in the second channel 120 of the channel plate. Thus an increase in light harvesting properties of the system and a reduction in the surface area of the solar cells (and thus cost) is attained.

Figure 5K:
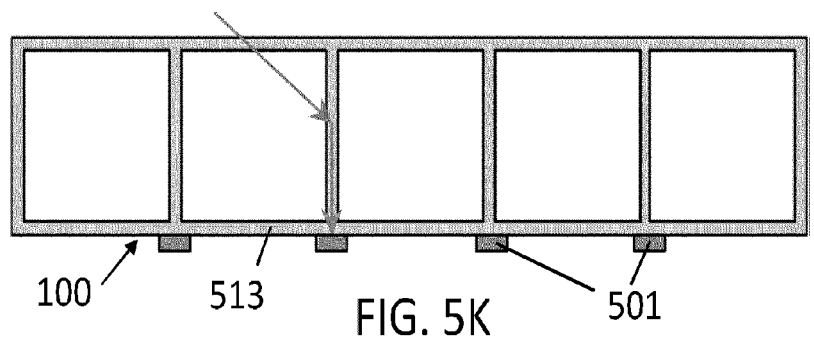

FIG. 5K schematically depicts a channel plate 100 similar to FIG. 5H-J, i.e. in the same way, part of the multiwall panel may comprise luminescent material 513 and convert light which is subsequently directed to a solar cell 501 provided on a main surface 503 of the multi-channel plate.

Figure 5L:
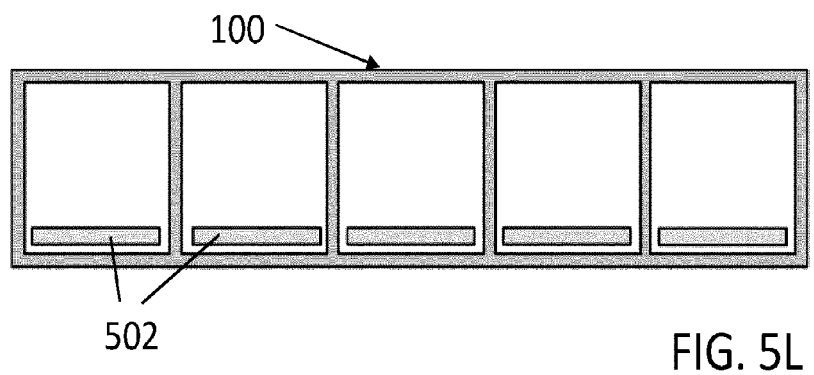
Figure 5M:
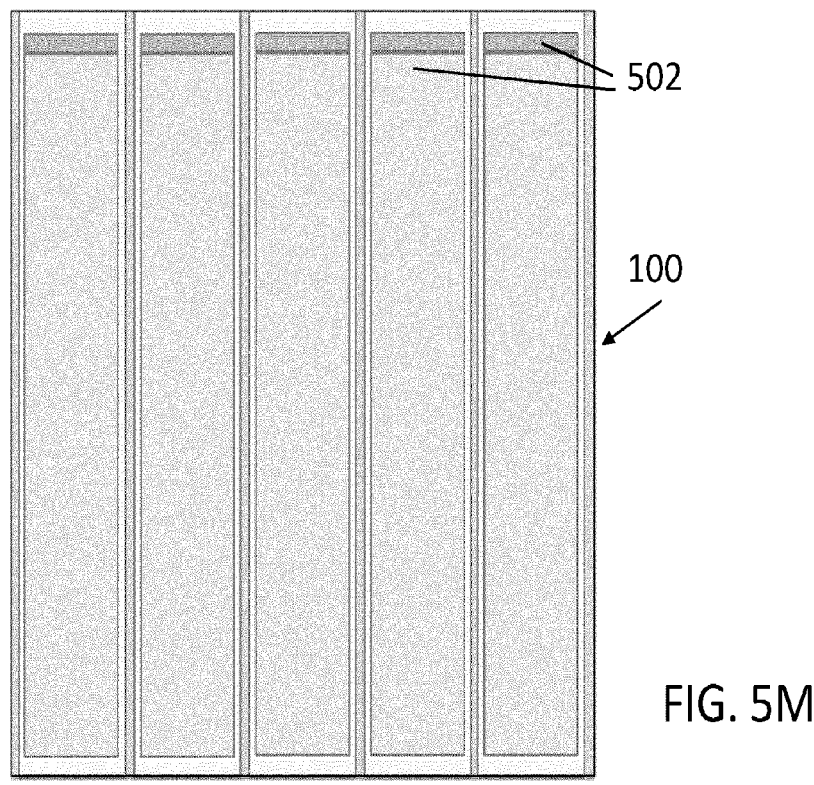

FIG. 5L-M schematically depicts a channel plate 100 which comprises solar concentrators 502 instead of solar cells.

Figure 5N:
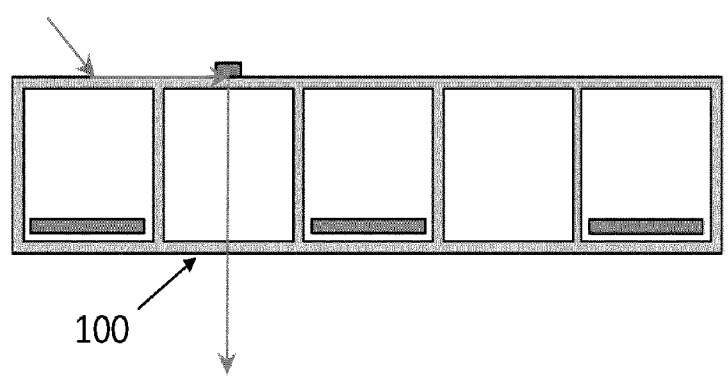
Figure 5N:
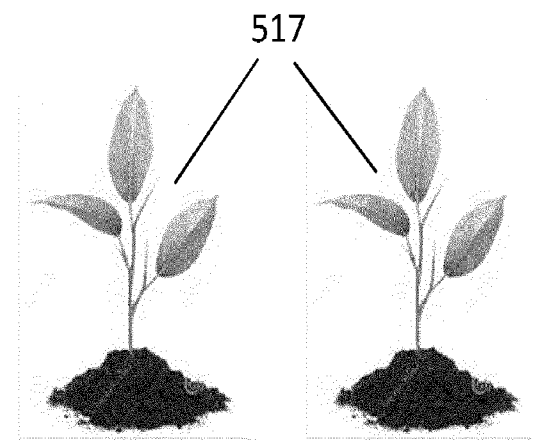

FIG. 5N schematically depicts a channel plate 100 in which part of the converted light is directed towards plants 517, for example in a greenhouse, in an efficient way and with an optimized spectrum.

Figure 5P:
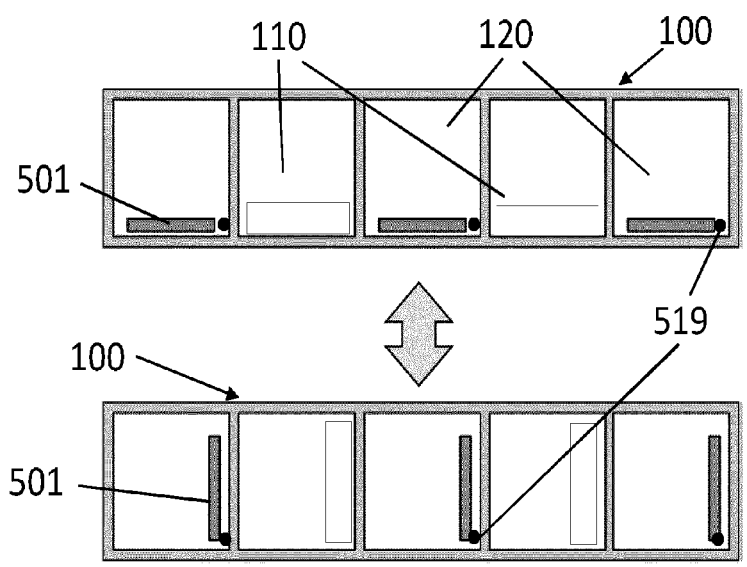

FIG. 5P schematically depicts a channel plate 100 which comprises linear solar cells 501 inside second channels 120 which can be flipped around a longitudinal axis 519 extending parallel to the length direction of channels in such a way that the individual solar cells are always facing the sun as much as possible. Step-wise flipping can be done with small electric actuators (not shown). First channels 110 are in interdigitated arrangement with the second channels.

Figure 6A:
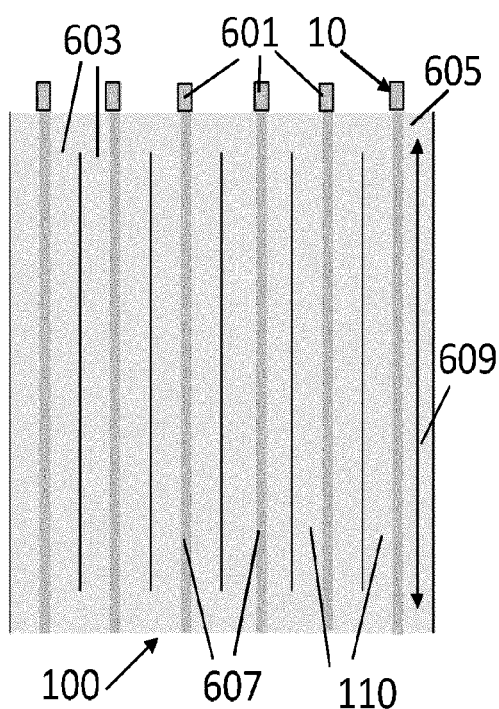

FIG. 6A schematically depicts a top view of a multi-channel plate 100 which comprises laser diodes 601 as light sources 10 provided at openings 603 at one end 605 of first channels 110. Light source light from the laser diodes is coupled into a plurality of solid light guides 607 that are provided in the first channels essentially over the full length 609 of said first channels. The light guides are provided with a pattern (see for example FIG. 6G) via which a homogeneous light output from the light guide is obtained over the length of the light guide. Second channels are not shown, but are present behind the first channels in the direction as shown in FIG. 6A.

Figure 6B:
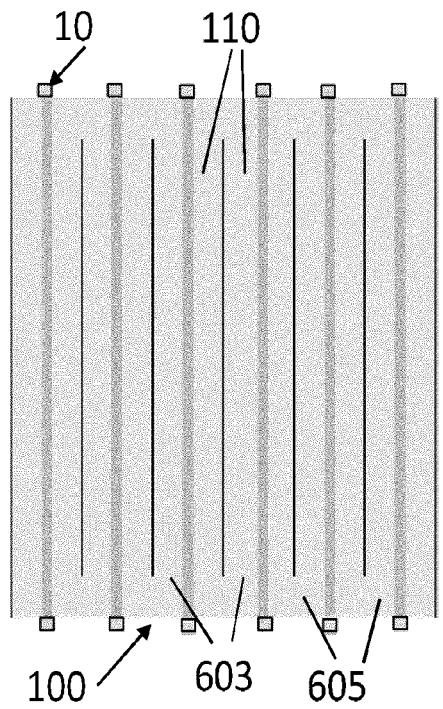

FIG. 6B schematically depicts a top view of a channel plate 100 which comprises light sources 10 (multi LED strips) in openings 603 at both ends 605 of the first channels 110 in the multi-channel plate. Second channels are not shown, but are present behind the first channels in the direction as shown in FIG. 6B.

Figure 6C:
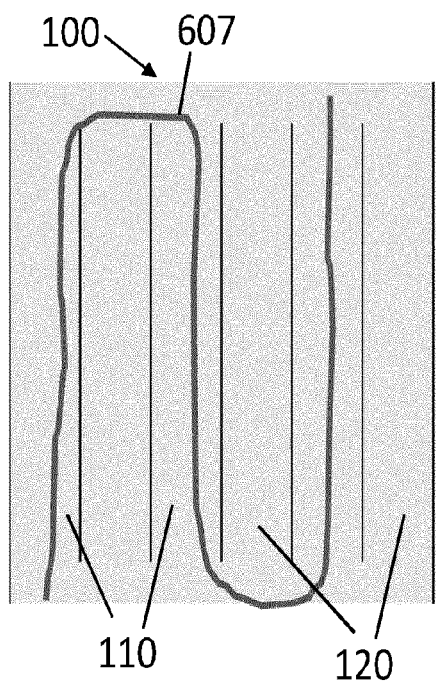

FIG. 6C schematically depicts a channel plate 100 which comprises a single light guide 607 woven through first channels 110 in the multi-channel plate. Second channels 120 are in interdigitated configuration with the first channels.

Figure 6D:
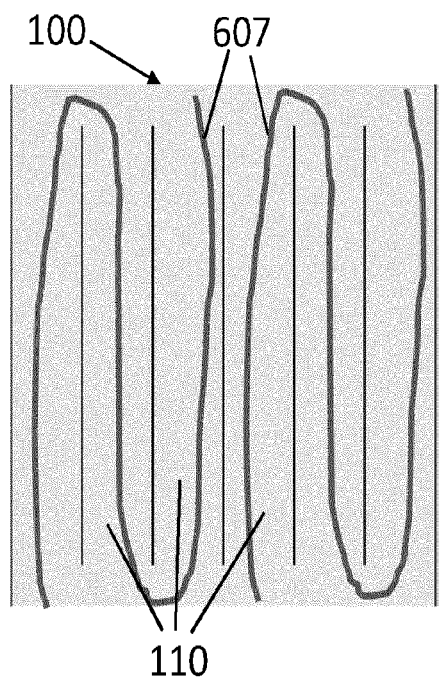

FIG. 6D schematically depicts a channel plate 100 which comprises a two light guides 607 woven through first channels 110 in the multi-channel plate. Second channels are not shown, but are present behind the first channels in the direction as shown in FIG. 6D.

Figure 6E:
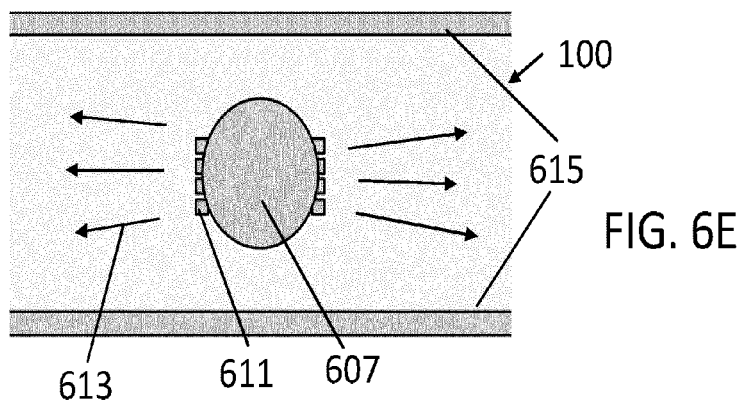

FIG. 6E schematically depicts a channel plate 100 which comprises outcoupling means 611 on the light guides 607 which are positioned such that light is mainly extracted in the directions 613 along to main surfaces 615 of the multi-channel plate to further improve the homogeneity of the light emitted by the multi-channel plate.

Figure 6F:
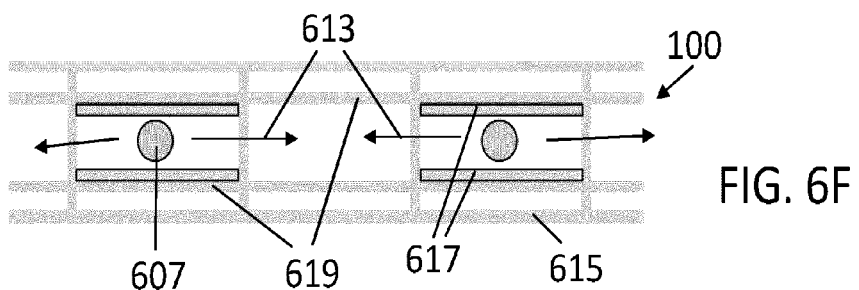

FIG. 6F schematically depicts a channel plate 100 which comprises light guides 607 which are partly covered with a light redirection means 617 such as a diffuser which is placed in the vicinity mode parallel to adjacent walls 619 such that light is mainly extracted in the directions 613 along the main surfaces 615 of the multi-channel plate to further improve the homogeneity of the light emitted by the multi-channel plate.

Figure 6G:
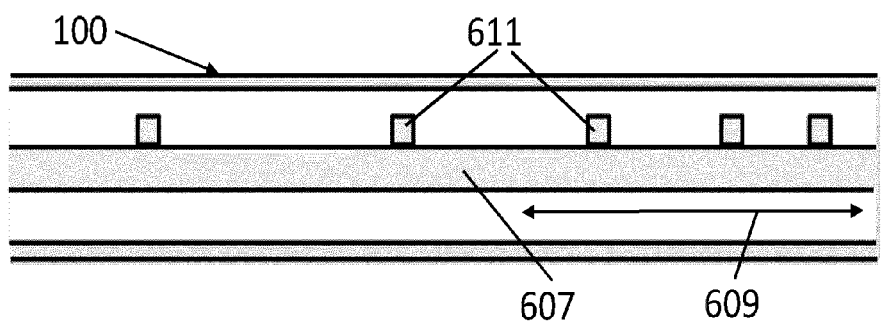

FIG. 6G schematically depicts a channel plate 100 which comprises scattering outcoupling means 611 on a light guide 607 such that light is extracted homogeneously along the length 609 of the light guide, i.e. light extraction means comprises a scattering pattern with a gradient. Similar configurations are envisaged for luminescent, reflective, diffractive and refractive patterns.

Figure 6H:
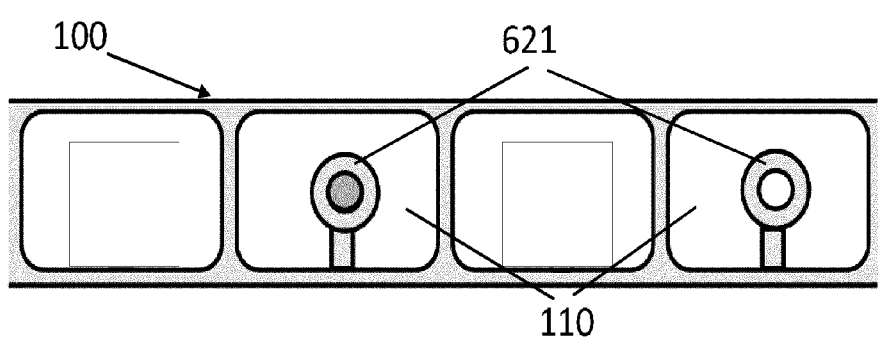

FIG. 6H schematically depicts a channel plate 100 which comprises sub-channels 621 in the first channels 110 which can be filled with a light source, a light emitting part, a liquid, electrical parts etc.

Figure 6J:
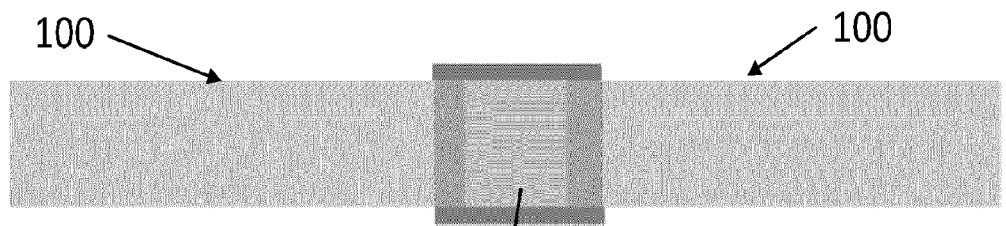

FIG. 6J schematically depicts channel plates 100 which comprises external connection means 625 for mutual mechanical (and optionally also electrical) connection of multi-channel plates to each other.

Figure 6K:
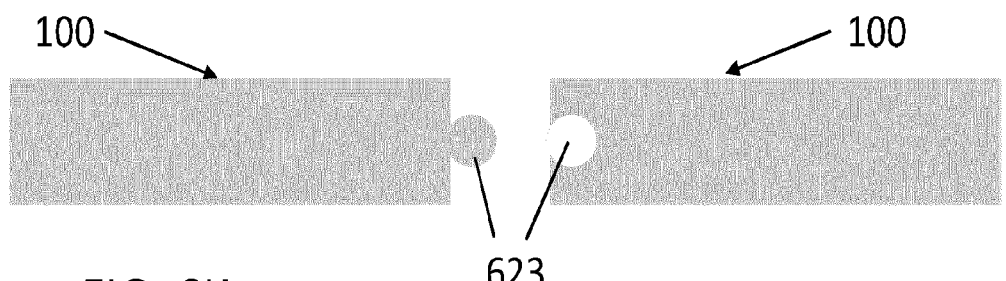

FIG. 6K schematically depicts channel plates 100 which comprises integrated connection means 623 for mutual mechanical (and optionally also electrical) connection of multi-channel plates to each other.

Figure 6L:
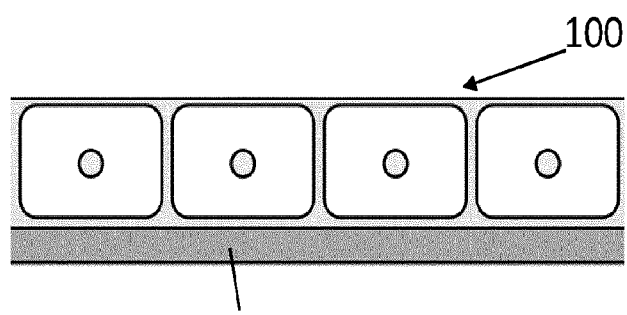

FIG. 6L schematically depicts a channel plate 100 which comprises additional optics 627 such as a reflector foil, for example at one side for providing only light at one surface.

Figure 6M:
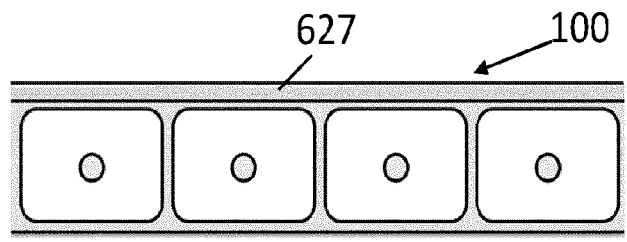

FIG. 6M schematically depicts a channel plate 100 comprising additional optics 627 such as a diffuser foil for providing homogeneous lighting.

Hence, the invention provides in an embodiment a one-piece channel plate that allows for different functions and can integrate them, enabling the use of very few components. The multi-channel plate at least includes a luminaire optical housing and may integrate functions like optics, mechanics, appearance, electric insolation, packing/fixation of other components and installation. Compartments and structures with (if necessary) specific material properties (e.g. transparent, opaque and solid), dimensions and shapes can be co-extruded (or afterwards inserted). Further, other components like light engine (e.g. LED strip(s)), driver, sensors, can be inserted in the packing/fixation compartments. The use of LED PCB/strips and other components is made easy as channels can be designed to allow for slide insertion and fixation assembly. The main part of the channel plate construction may stay cool (hot and cold channels), i.e. no (substantial) creep of the channel plate over time.

A wide range of applications may include, next to lighting: mechanical, insulation, optical, esthetical, water/liquid tubing/plumbing, etc.

The multi-channel plate can be used as roof, wall, floor, separator, box, etc., or can be attached to a roof, a wall, a floor, a separator, etc. The channel plate can be rigid by choosing the right geometrical construction of the channel walls. Channels can be empty and only have a mechanical function, i.e. is to bridge space. The channel plates can be used as an element to make something rigid, to provide a base/foundation to build upon, to support, to bridge, to fill, etc. Elements/shapes/holes can be added to the channel structure to fixate/support/suspend the channel plate and to connect them mechanically to each other.

Further, the multi-channel plate can be used for insulation or isolation, i.e. to block, separate, isolate, protect. Insulation may e.g. include insulation from liquids and/or gases (e.g. waterproof), electrical insulation, thermal insulation, acoustic insulation, etc.

Optical aspects may include blocking light or permitting light to (partially) pass, changing the properties of light, e.g. color, direction and intensity, etc.

The water/liquid tubing/plumbing may e.g. include that some or all channels are made of materials that are non-permeable/-porous to water or other liquids and/or gases (e.g. clean air), the channel plate can be used for transporting these. In principle, any channel shape and diameter as desired can be made. In combination with transporting water, the channel plate can be equipped with components that deliver the water at the desired place like taps (nozzles) and sprinkling installation for firefighting, watering plants etc. Alternatively, the channels can be used to host/accommodate existing pipes and tubing system. Channels can be used as gutter for wires, lines, cables, etc. All kinds of wires can be inserted, e.g. electrical power cables and data carriers like glass fibers or Ethernet cables. The channel can provide protection and isolation making an extra around the wire to isolate or protect unnecessary.

The channel(s) may also include heating elements. However, the channel also allows for other types of heating element, for instance electrical (hot wire) and hot water. In the case of hot water, the channel should be of non-leaking/-porous material.

The channel(s) may include sensors. All types of sensors may be possible, as long as the channel dimensions accommodate for the sensor.

Furthermore, different channels may have different functions. For instance, some channels have a mechanical function only (e.g. bridging space and providing rigidity) while others have an optical function or function as water pipe. Each channel may house different functionalities. Thus, the overall function and dimensions of the device/product is not achieved by repeating the same channel. To accommodate different function, different channels may have different shapes, dimensions, materials, mechanical properties and/or optical properties.

With the invention, continuation of channels along multiple plates can be realized by positioning/outlining the plates so that the right channels are in line with each other. Connection of channels (parallel within the same plate or extension of the channel from one plate to another between different plates) can be achieved by connection pieces that can be plugged into/over the channels that need to be connected. Further, one or more channels can be ended, closed or sealed by using a plug or end cap.

A straightforward way to produce the channel plate is by extrusion. Benefits include the easy adaptation of the design by just changing the extrusion mold and/or material. Virtually any size and shape are possible. The channel structure allows for thin walls to achieve mechanical strength. A rigid structure, with impact resistance and without sagging/creeping can be provided. Robustness and rigidity can be achieved by the geometry of the channel walls and spaces. Having one component existing of multiple channels next to each other and/or multiple channels above each other prevents sagging in the direction of the channels and perpendicular to the channels. Individual or all cavities may be sealed for life—e.g. waterproof. A wide range of materials with mechanical and optical features is applicable for extrusion; the lighting application only requires that at least one channel has at least one translucent side. Extra structures and shapes, of different mechanical and optical properties, can be co-extruded on the inside of the channels and outside of the plate. Adjacent as well as stacked channels can be extruded as one piece ("body").

Hence, the invention (also) provides applications where light with non-lighting functions are integrated, such as a horticulture application. However, a multi-channel plate can also be used as a luminaire housing or construction alone, with lighting related functions and/or components integrated in the multi-channel plate (such as mechanical strength, power supply integration, drivers and/or processors integration, sensor integration, etc.). The multi-channel plate may comprise several layers, wherein in the front layer of channels, each channel is filled with light emitting elements such as LED strips. In this way, the entire light emitting surface without a 'spacer' between them. The rear layer of channels can be used for other functions as described in the patent (see also the comments above in relation to FIG. 1a). Further, the multi-channel plate may comprise several layers in which one of the layers has a smaller surface area than the other.

The invention claimed is:

1. A multi-channel plate comprising
   (i) at least one first and at least one second parallel arranged channel, wherein the first channel and second channel are part of a single polymer body, and wherein one or more channel walls circumvent a channel cavity, and
   (ii) at least a light source configured to provide light source light to said at least first channel, which includes a light transmissive part and is configured to provide as a first lighting function said light source light downstream from the light transmissive part and to the exterior from said multi-channel plate, and wherein said at least one second channel is configured to provide an additional function different from said first lighting function, and
   said multi-channel plate has a height and a width that are each smaller than a length of the multi-channel plate, with the width being at least 4 times the height of the plate;
   wherein the multi-channel plate comprises one or more first channels having said first lighting functionality and one or more second channels having at least one additional function different from said first lighting function.

2. The multi-channel plate according to claim 1, wherein the one or more first channels and one or more second channels form a group that is repeated one or more times in the multi-channel plate.

3. The multi-channel plate according to claim 1, wherein the first channel includes optics integrated with a channel wall and being part of a single polymer body.

4. The multi-channel plate according to claim 1, wherein the light source includes at least one light emitting part configured within the first channel, said at least one light emitting part is at least one of the group consisting of a multi-LED strip, a laser diode, a solid light guide, a patterned solid light guide, a coating/film of luminescent material, a transparent coating/film of luminescent material.

5. The multi-channel plate according to claim 4, wherein the first channel includes a sub-channel with a cross-section smaller than a cross-section of the first channel, configured to host the at least one light emitting part.

6. The multi-channel plate according to claim 1, wherein at least part of the second channel is not transmissive for light.

7. The multi-channel plate according to claim 1, wherein said at least one second channel is configured to provide at least one additional function different from said first lighting function and is selected from the group of functions consisting of photovoltaic cell, fluid transportation means for fluids like fluid-tight tubes or connectors or nozzles, suspension means, electric equipment like electric cables, ICT equipment, detectors/sensors, circuitry, electric power sources, electrical connectors, charge controller, a battery system, and an inverter.

8. A horticulture construction including a plurality of multi-channel plates according to claim 1, wherein one or more second channels provide one or more of water and food to a plant included in the horticulture construction.

9. A kit of parts including a plurality of multi-channel plates according to claim 1 and one or more connectors, wherein the one or more connectors are configured to connect installed adjacent multi-channel plates to each other.

10. The kit of parts according to claim 9, wherein the one or more connectors are configured for providing a fluid tight connection between a second channel of a first multi-channel plate and a second channel of a second multi-channel plate.

11. The kit of parts according to claim 9, wherein at least one of the one or more connectors is configured to connect adjacent multi-channel plates with an angle between the adjacent multi-channel plates of less than 180°.

12. A method for producing a multi-channel plate according to claim 1, the method comprising:
   a. providing an extrusion starting material;
   b. multi-channel extruding the extrusion starting material into a multi-channel plate, where the process includes intermediate cooling or heating; and
   c. providing a light source to the multi-channel plate.

13. The method of producing a multi-channel plate according to claim 12, wherein the extrusion starting material includes glass material.

14. A multi-channel plate comprising
   (i) at least one first and at least one second parallel arranged channel, wherein the first channel and second channel are part of a single polymer body, and wherein one or more channel walls circumvent a channel cavity, and
   (ii) at least a light source configured to provide light source light to said at least first channel, which includes a light transmissive part and is configured to provide as a first lighting function said light source light downstream from the light transmissive part and to the exterior from said multi-channel plate, and wherein said at least one second channel is configured to provide an additional function different from said first lighting function, and
   said multi-channel plate has a height and a width that are each smaller than a length of the multi-channel plate, with the width being at least 4 times the height of the plate, and
   wherein the thickness of the walls varies over one or more of the length, width, and height of the multi-channel plate.

15. The multi-channel plate according to claims 1, wherein at least part of the multi-channel plate includes a luminescent material.

* * * * *